UNITED STATES PATENT OFFICE.

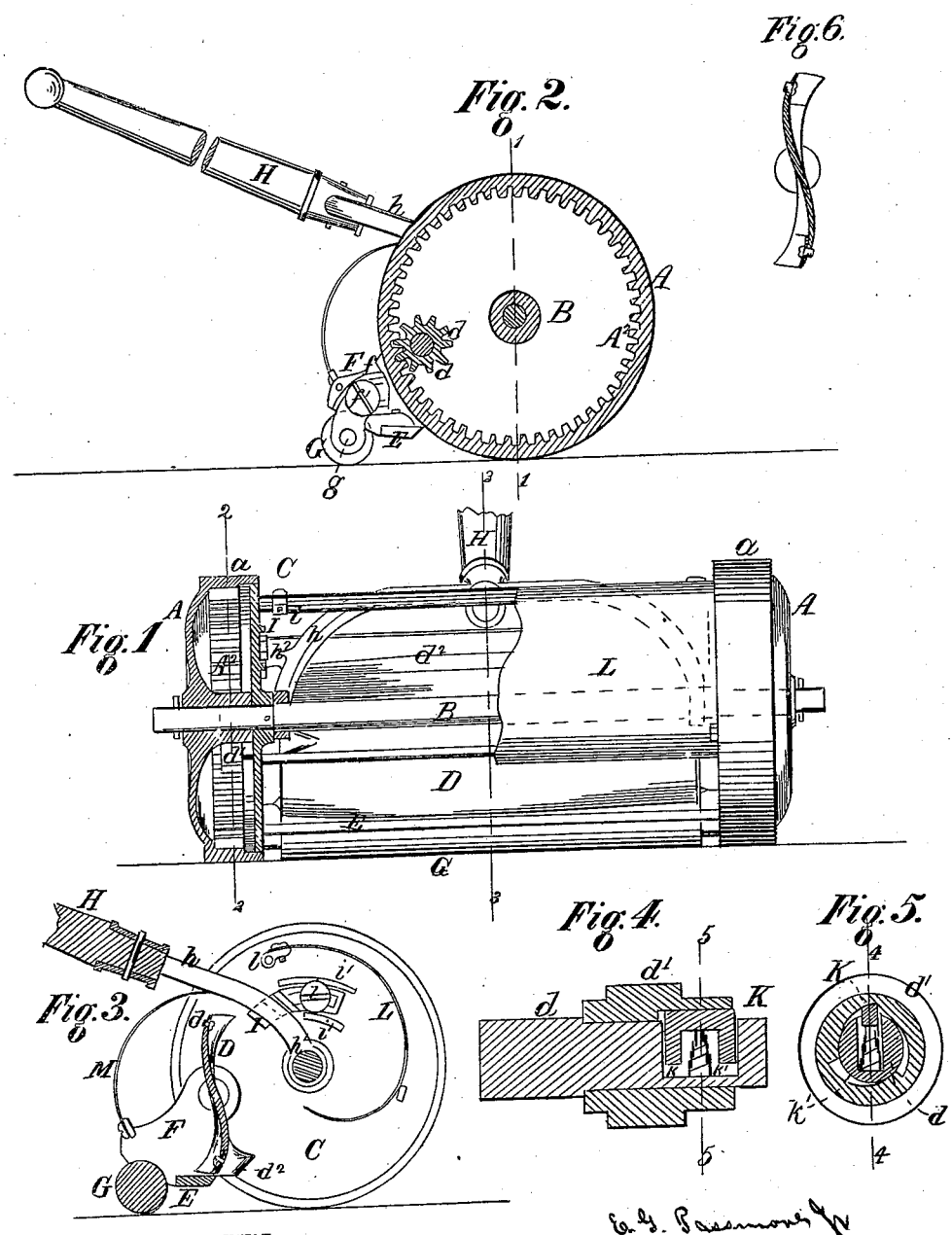

EVERETT G. PASSMORE, OF PHILADELPHIA, PENNSYLVANIA.

IMPROVEMENT IN LAWN-MOWERS.

Specification forming part of Letters Patent No. 87,286, dated February 23, 1869.

*To all whom it may concern:*

Be it known that I, EVERETT G. PASSMORE, of the city and county of Philadelphia, in the State of Pennsylvania, have invented certain new and useful Improvements in Harvesters, of which the following is a full, clear, and exact description:

My invention consists in a novel method of combining, in a harvester, two disks on the main driving-axle with a fixed blade, and a cutter rotating on a horizontal axis, both the fixed and movable cutters being mounted on the disks.

My invention further consists in a novel method of combining, in a harvester, two driving-wheels turning loosely on the main axle, and two disks fixed on said axle, with cutters arranged between the driving-wheels.

My invention further consists in a novel method of combining, in a harvester, two driving-wheels carrying internal spur-gears, and turning loosely on the main axle, disks fixed on said axle, and fitting into the driving-wheels, rotary cutters arranged between the wheels on a shaft projecting through the disks, and carrying pinions meshing into the driving-gears.

My invention further consists in a novel method of combining two driving-wheels turning loosely on the main axle, and disks fixed on said axle, with a tongue hinged loosely on said axle, and locking into adjustable lugs or stops on the disks, whereby the cutting apparatus may be raised or lowered.

My invention further consists in a novel method of combining, in a harvester, a disk-frame with flexible metal covers, to protect the mechanism and retain the cut crop, sprung into place between the disks, and held by notches therein.

In the accompanying drawings, which make part of this specification, I have shown all my improvements as embodied in a machine for mowing lawns by hand. It is obvious, however, that some parts of my invention may be used without the others, and that some of my improvements may be advantageously used in harvesters generally.

Figure 1 is a view, partly in section, at the line 1 1, Fig. 2, and partly in elevation, of my improved machine as seen from the front. Fig. 2 is a vertical section through the same at the line 2 2 of Fig. 1. Fig. 3 is a vertical transverse section through the machine at the line 3 3 of Fig. 1. Fig. 4 is a longitudinal section through the backing-ratchet at the line 4 4 of Fig. 5; Fig. 5, a transverse section through the same at the line 5 5 of Fig. 4, and Fig. 6 a vertical transverse section through the cutters.

In this instance, two driving-wheels, A A$^1$, run loosely on a common axle, B. These wheels are cast with an inwardly-projecting flange, $a$, and with internally-geared spur-wheels A$^2$. Disks C are keyed on this axle B, and fit snugly in the flanges of the wheels, as shown in Fig. 1, but are not tight enough to prevent the turning of the wheels on the axle, which, as well as the disks, remains fixed. The disks exclude dust and grit from the gearing. A cutter, in this instance consisting of a rotating spiral blade, D, turns on trunnions $d$, projecting through the disks, and carrying spur-pinions $d^1$, which mesh into the driving-gears A$^2$. The cutter-blades are made of thin steel strips $d^3$, bolted to the cast-iron body D in such manner that the strips may be set to project farther from the body as their edges wear away. This construction is much more desirable than making the cutters all in one piece, as, besides its cheapness, it enables the blades easily to be removed, replaced, or sharpened. A fixed blade, E, is secured to lugs F, secured to the disks, and projecting beyond their peripheries. A roller, G, to sustain this cutter at a uniform height above the ground, is mounted in short curved arms $g$, sliding endwise in correspondingly-curved guides $f$. The arms $g$ are slotted at their upper ends, and may be adjusted to raise or lower the cutters by means of set-screws $f'$. The tongue H, in this instance, is forked, and its forks $h$ are provided with loops $h^1$, which fit the axle, so that the tongue can play vertically independently of the axle. Lugs $h^2$ on the forks of the tongue play in recesses in lugs I on the disks. These lugs are curved and slotted, and play endwise in guides $i'$ on the disk, and are adjusted by set-screws $i$, as shown in Fig. 3, in order to set the tongue higher or lower. The tongue is allowed slight vertical play in these lugs also. In order that the gearing may stop when the machine is backed I form a recess, $k$, in the shaft which drives the cutters—in this instance the trunnions $d$. This shaft runs inside of the driven pinion $d^1$, or of a shaft on which the pinion is mounted, the inside being formed into ratchets, as shown in Fig. 5. A yoke or pawl, K, plays radially to the shaft, and is pressed outward by a spring, $k'$; consequently, when the shaft turns forward, the pawl catches against the ratchets and drives the cutters, but slips over them when backed, in the usual way. This is a useful device, as the pawl is out of sight, protected from injury, and yet is accessible at any time merely by slipping the pinion from the shaft. To protect the gearing, and also to form a receptacle for the cut crop, I provide a cover, L, of sheet metal, with eyes at its upper edge to receive a rod, $l$, which enters holes in the disks C, and thus forms a hinge for the cover. The cover is curved, as shown in Fig. 3, so that its lower edge rests near the axle B. Another cover, M, is provided with points at its corners, so that they may be sprung into holes in the disks C and lugs $f$, and securely hold the cover in place.

In operation the workman seizes the handle and pushes the machine before him. The rotary cutters shear off the grass as it comes against the fixed cutter E, and throw it over the axle into the receptacle formed by the case L.

What I claim as my invention, and desire to secure by Letters Patent, is—

1. The combination, substantially as set forth, of fixed disks on the driving-axle with fixed and rotary cutters mounted on the disks.

2. The combination, substantially as set forth, of two driving-wheels, disks fixed on the driving-axle, and cutters arranged between the wheels.

3. The combination, substantially as set forth, of loose driving-wheels, internal gears, fixed disks, rotary cutters, and pinions mounted directly on the cutter-shaft.

4. The combination, substantially as set forth, of loose driving-wheels, fixed disks, a tongue hinged on the axle, and stops on the disk.

5. The combination, substantially as set forth, of the disk-frame with flexible metal covers or guards between the disks.

In testimony whereof I have hereunto subscribed my name.

EVERETT G. PASSMORE.

Witnesses:
WM. B. DAYTON,
HENRY BALDWIN, Jr.